No. 704,428. Patented July 8, 1902.
W. Y. ALLEN.
DEVICE FOR GRINDING TAPERS.
(Application filed Sept. 28, 1901.)
(No Model.)

Witnesses:

Inventor:
Wm. Y. Allen,
by E. D. Chadwick,
Attorney.

UNITED STATES PATENT OFFICE.

WILLIAM Y. ALLEN, OF NEWTON, MASSACHUSETTS.

DEVICE FOR GRINDING TAPERS.

SPECIFICATION forming part of Letters Patent No. 704,428, dated July 8, 1902.

Application filed September 28, 1901. Serial No. 76,925. (No model.)

*To all whom it may concern:*

Be it known that I, WILLIAM Y. ALLEN, a citizen of the United States, residing at Newton, in the county of Middlesex and State of Massachusetts, have invented certain new and useful Improvements in Devices for Grinding Tapers, of which the following is a specification.

My invention relates to dental appliances, and is intended to provide a simple and practical device for grinding tapers on the ends of porcelain sticks, such as are used in making plugs for filling circular-shaped cavities in teeth. These tapers have always been ground hitherto, so far as I am aware, by holding one end of a porcelain stick on a small grindstone and turning it in the fingers until the required taper has been formed or by securing one end of the stick in a revolving mandrel and applying to its other end a stationary grindstone or other abrading device held in the hand, processes which are not only slow and tedious, but also require a considerable amount of skill on the part of the operator, thus making it difficult to produce as accurate results as are desirable. By means of my device the ends of a porcelain stick may be ground to the desired taper with great ease and quickness and without requiring any particular skill on the part of the operator, the tapers thus produced being also perfectly accurate and uniform.

Figure 1:
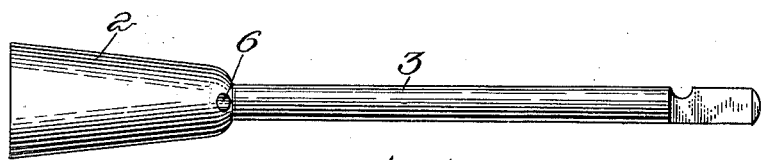
Figure 2:
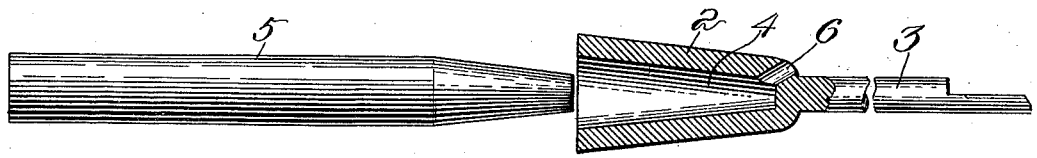
Figure 3:
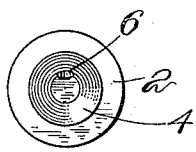

In the accompanying drawings, Figure 1 is a side elevation of my device. Fig. 2 is a central longitudinal section thereof, showing also in side elevation a stick of porcelain with a taper ground on it; and Fig. 3 is an end view of the device shown in Fig. 1.

My device consists of a head 2, usually made of steel or composition metal and provided at one end with means whereby the device may be conveniently and rapidly rotated, such as a central stem or shaft 3, formed at its free end to fit and be held by the chuck of a dental engine. The head 2 is hollowed out to provide a conical cavity 4, corresponding in shape and size to the taper desired to be given to the sticks ground by it, as shown in Fig. 2, said cavity being circular in cross-section, with its greatest diameter at the outer or open end of said head and having its longitudinal axis in the same straight line with the axis of the shaft 3. This cavity 4 is formed by simply reaming out the head 2 to the required size, its interior surface being neither provided with teeth nor necessarily polished or otherwise finished in any way.

In using the device a small quantity of an abrasive material, preferably a mixture of carborundum-powder and glycerin, is placed in the cavity 4, the device is rapidly rotated by means of a dental engine or otherwise, and one end of a stick 5 of porcelain is inserted into said cavity as far as its size will permit. The particles of carborundum being held in contact with the stick 5, which does not revolve, and the inner walls of the revolving head 2 by the adhesive action of the glycerin act as teeth to grind away the substance of the stick until it is of the same size and shape as the cavity 4, said cavity serving to center the stick 5 automatically and also as a receptacle to hold a quantity of the abrasive material sufficient for the work required. The taper is thus ground with perfect accuracy and without requiring any special skill on the part of the operator, and all tapers ground on different sticks must necessarily be uniform. The walls of the head 2, being made of metal, resist the action of the abrasive material, so that the device retains the accuracy of its taper for a long time, and as it has neither teeth nor cutting edges to be kept sharp it is equally efficient at all times.

I prefer to provide a small hole 6, leading from the outside of the head 2 to the cavity 4 and entering the latter near its inner end, said hole being preferably arranged at a small angle with the axis of the device. This hole 6 serves to permit the escape of air and of any surplus of the abrasive mixture when the stick 5 is inserted into the cavity 4, and it also serves when arranged at substantially the angle described to permit the introduction of a small pin or wire in order to remove the end of a porcelain stick in case it should be broken off and become wedged within said cavity.

My device is ordinarily made and sold in sets, each member of the set having a different internal angle and diameter from the others in order to provide plugs of different sizes, the smaller differences in size being obtained by cutting off more or less from the tapered end of a given plug.

I claim as my invention—

1. A dental instrument for grinding tapers, comprising a shaft having at one end a head provided with a conical cavity which is axially concentric with said shaft and corresponds with the taper to be ground, the walls of said cavity being free from cutting devices and being made of rigid material of greater wear-resisting qualities than the material to be operated upon, substantially as described.

2. A dental instrument for grinding tapers, consisting of a head provided at one end with means whereby it may be rotated, and hollowed out in the form of a conical cavity, said cavity being formed to correspond with the taper to be ground and having its interior surface free from cutting devices, and said head being provided with a hole extending from its exterior to its interior, near the inner end of the latter, substantially as described.

In testimony whereof I have hereunto subscribed my name this 16th day of September, 1901.

WILLIAM Y. ALLEN.

Witnesses:
E. D. CHADWICK,
JOSEPH T. BRENNAN.